(12) United States Patent
Tsujita

(10) Patent No.: US 10,525,779 B2
(45) Date of Patent: Jan. 7, 2020

(54) RECEIVER

(71) Applicant: PACIFIC INDUSTRIAL CO., LTD., Ogaki-shi, Gifu-ken (JP)

(72) Inventor: Yasuhisa Tsujita, Motosu (JP)

(73) Assignee: PACIFIC INDUSTRIAL CO., LTD., Gifu-Ken (JP)

( * ) Notice: Subject to any disclaimer, the term of this patent is extended or adjusted under 35 U.S.C. 154(b) by 0 days.

(21) Appl. No.: 15/765,441

(22) PCT Filed: Apr. 27, 2017

(86) PCT No.: PCT/JP2017/016768
§ 371 (c)(1),
(2) Date: Apr. 2, 2018

(87) PCT Pub. No.: WO2018/198271
PCT Pub. Date: Nov. 1, 2018

(65) Prior Publication Data
US 2019/0070908 A1    Mar. 7, 2019

(51) Int. Cl.
*B60C 23/04* (2006.01)
*G08C 17/02* (2006.01)
(Continued)

(52) U.S. Cl.
CPC .......... *B60C 23/0459* (2013.01); *B60C 23/04* (2013.01); *B60C 23/0416* (2013.01);
(Continued)

(58) Field of Classification Search
USPC .................................................. 340/445, 447
See application file for complete search history.

(56) References Cited

U.S. PATENT DOCUMENTS 5,764,137 A * 6/1998 Zarkhin ................ B60C 23/061
340/442
10,160,270 B2 * 12/2018 Araya ..................... B60C 23/04
(Continued)

FOREIGN PATENT DOCUMENTS

CN         102252691 A      11/2011
EP           2759418 A1      7/2014
(Continued)

OTHER PUBLICATIONS

Office Action issued in Korean Patent Application No. 10-2018-7009683, dated Apr. 26, 2019; 4 pages.
(Continued)

*Primary Examiner* — Masud Ahmed
(74) *Attorney, Agent, or Firm* — Cantor Colburn LLP

(57) ABSTRACT

Each of transmitters attached to respective wheel assemblies transmits transmission data when the wheel assembly reaches any of specific angles set at equal angular intervals. A receiver mounted in the vehicle obtains the rotation angles of the wheel assemblies from a rotation angle detecting section upon reception of the transmission data and obtains specific rotation angles by correcting the obtained rotation angles by using the value of the angle difference between the specific angles. The specific rotation angles are values that can be regarded as rotation angles that are obtained upon reception of the transmission data transmitted at the same specific angle. The receiver identifies the correspondence between ID codes included in the transmission data and the wheel assemblies by using the specific rotation angles.

3 Claims, 4 Drawing Sheets

(51) Int. Cl.
*G08C 17/00* (2006.01)
*G01L 17/00* (2006.01)

(52) U.S. Cl.
CPC ...... *B60C 23/0488* (2013.01); *B60C 23/0489* (2013.01); *G08C 17/00* (2013.01); *G08C 17/02* (2013.01); *G01L 17/00* (2013.01)

(56) References Cited

U.S. PATENT DOCUMENTS

| | | | | |
|---|---|---|---|---|
| 2006/0012469 | A1* | 1/2006 | Hirai | B60C 23/0416 340/445 |
| 2011/0071737 | A1* | 3/2011 | Greer | B60C 23/0416 701/49 |
| 2012/0112899 | A1* | 5/2012 | Hannon | B60C 23/0416 340/445 |
| 2014/0055255 | A1* | 2/2014 | Kim | B60C 23/0416 340/442 |
| 2014/0184403 | A1* | 7/2014 | Kosugi | B60C 23/0416 340/447 |
| 2015/0191056 | A1 | 7/2015 | Mori et al. | |
| 2017/0259627 | A1 | 9/2017 | Araya | |

FOREIGN PATENT DOCUMENTS

| | | |
|---|---|---|
| JP | 2012111481 A1 | 6/2012 |
| JP | 2014227124 A | 12/2014 |
| JP | 201513635 A | 1/2015 |
| KR | 101388622 B1 | 4/2014 |
| KR | 1020150041023 A | 4/2015 |
| KR | 20170040780 A | 4/2017 |
| WO | 2016190371 A1 | 1/2016 |

OTHER PUBLICATIONS

Notification of Reason for Refusal issued in Korean Patent Appiication No. 10-2018-7014506, dated Jul. 23, 2019; 8 pages.
Extended European Search Report issued in EP Application No. 17851949.2-1215, dated Sep. 12, 2019; 7 pages.

* cited by examiner

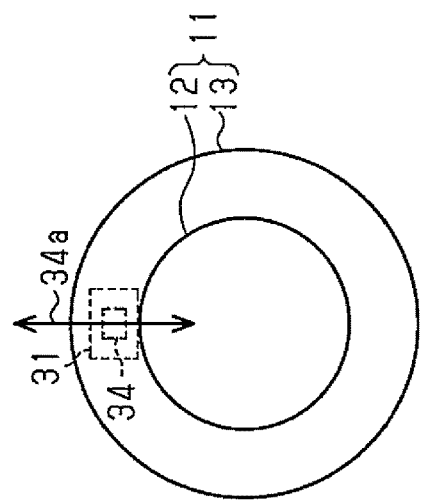
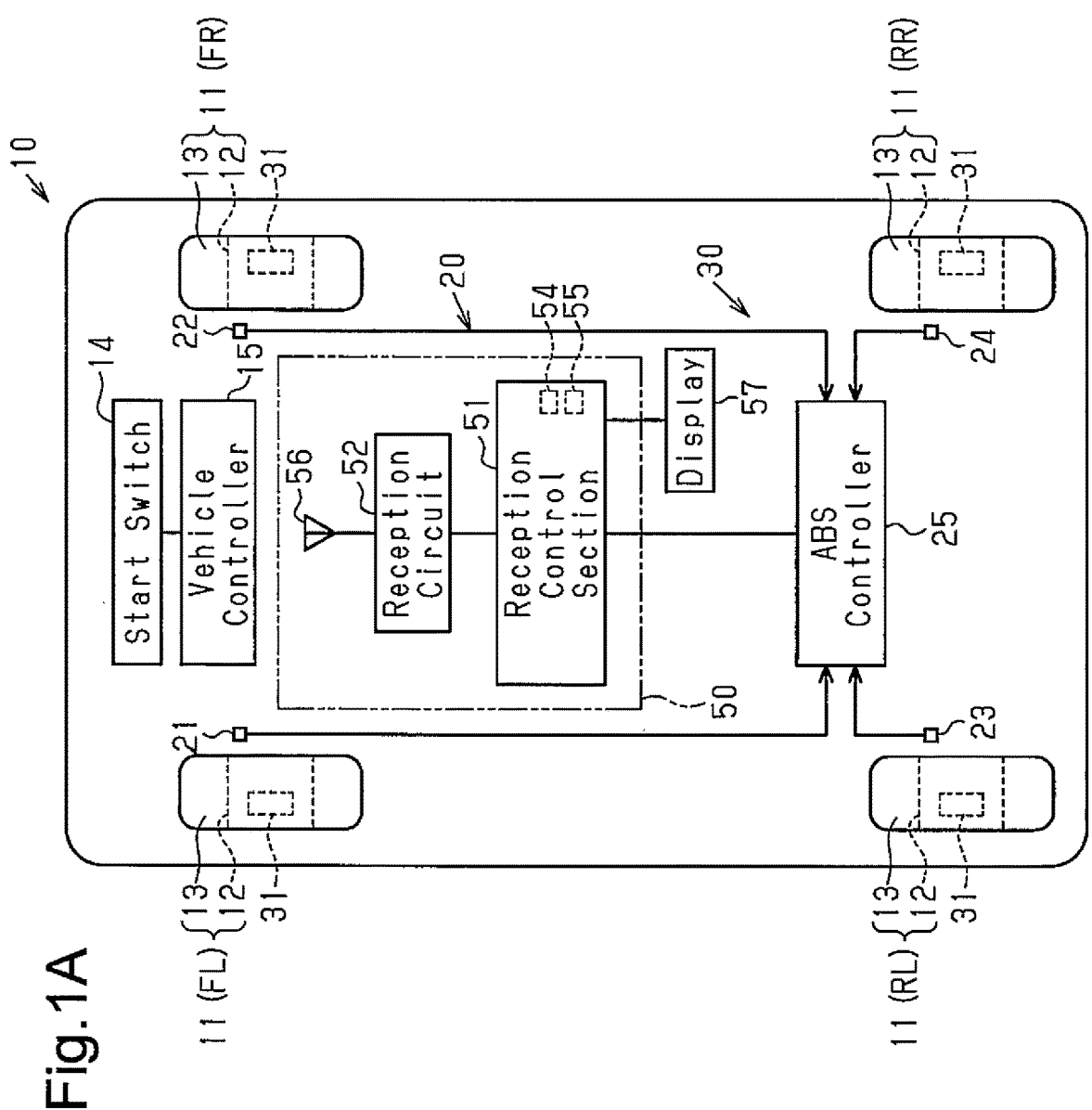

RECEIVER

TECHNICAL FIELD

The present invention relates to a receiver.

BACKGROUND ART

A tire condition monitoring apparatus is known as an apparatus that allows a driver to check the condition of the tires of a vehicle from the passenger compartment. The tire condition monitoring apparatus includes transmitters, which are respectively attached to wheel assemblies, and a receiver mounted on the vehicle. Each transmitter transmits transmission data including data indicating the condition of the tire to the receiver. The receiver receives the transmission data to acquire the condition of the tire.

In the tire condition monitoring apparatus described above, it is preferable that the receiver can identify the tire to which the tire condition included in the transmission data corresponds. In other words, it is preferable that the receiver can identify the wheel assembly to which the transmitter that has transmitted the received transmission data is attached. This type of tire condition monitoring apparatus is disclosed, for example, in Patent Document 1.

The tire condition monitoring apparatus disclosed in Patent Document 1 is mounted on a vehicle including rotation angle detecting devices that detect the rotation angles of the wheel assemblies. When detecting that the rotation angle of the wheel assembly matches a predetermined specific angle, the transmitter transmits transmission data. The receiver obtains the rotation angle of each wheel assembly from the rotation angle detecting device upon reception of the transmission date. The receiver identifies the wheel assembly to which each of the transmitters is attached based on the variation of the rotation angle of each wheel assembly obtained upon reception of the transmission data.

Some vehicles have a null point, at which signals of transmission data transmitted from the transmitters interfere with each other. When the specific angle at which the transmission data is transmitted coincides with the null point, the receiver cannot receive the transmission data transmitted at the specific angle. As a result, the receiver may be unable to identify the wheel assembly to which each transmitter is attached. Therefore, in some cases, two or more specific angles, at which transmission data is transmitted, are set.

When two or more specific angles are set, the rotation angles obtained upon reception of transmission data are classified for each specific angle at which the transmission data is transmitted, and the variation is obtained for each classified rotation angle.

PRIOR ART DOCUMENT

Patent Document

Patent Document 1: Japanese Laid-Open Patent Publication No. 2014-227124

SUMMARY OF THE INVENTION

Problems that the Invention is to Solve

In a receiver that identifies the wheel assembly to which each transmitter is attached based on the difference in the numbers of rotations (rotation speeds) of the wheel assemblies during traveling, the rotation angle that is obtained upon reception of the transmission data transmitted at the same specific angle needs to be acquired several times. When multiple specific angles are set, the number of times the rotation angle can be obtained is dispersed in correspondence with the number of specific angles. This configuration lengthens the time to obtain the required number of rotation angles to identify each transmitter as compared with a case in which transmission data is transmitted at a single specific angle (a fixed angle). As a result, it takes a longer time to identify the wheel assembly to which each transmitter is attached.

Accordingly, it is an objective of the present invention to provide a receiver capable of shortening the time required to identify the wheel assembly to which each transmitter is attached.

Means for Solving the Problems

To achieve the foregoing objective, a receiver is provided that is configured to be mounted on a vehicle having a rotation angle detecting section that detects rotation angles of respective wheel assemblies. A transmitter is attached to each wheel assembly. The receiver is configured to identify the wheel assembly to which each transmitter is attached. The receiver includes a receiving section, an obtaining section, a correcting section, and an identifying section. The receiving section is configured to receive transmission data that is transmitted from each transmitter when the transmitter detects that the associated wheel assembly is at any of specific angles, which are set at equal angular intervals in a possible range of the rotation angle of the wheel assembly. The obtaining section is configured to obtain the rotation angles from the rotation angle detecting section upon reception of the transmission data by the receiving section. The correcting section is configured to correct the rotation angles obtained by the obtaining section by using a value of an angle difference between the specific angles, thereby obtaining specific rotation angles that can be regarded as the rotation angles obtained upon reception of the transmission data transmitted at the same specific angle. The identifying section is configured to identify correspondence between ID codes included in the transmission data and the wheel assemblies by using the specific rotation angles.

With this configuration, the ID codes and the wheel assemblies are associated with each other by using the specific rotation angles, so that the wheel assembly to which each transmitter is attached is identified. The specific rotation angle is a value that can be regarded as a rotation angle that is obtained upon reception of the transmission data transmitted at the same specific angle. Even if the transmission data is transmitted at two or more specific angles, it is assumed that the transmission data has been transmitted at a single specific angle (a fixed angle), enabling the identification of the wheel assembly to which each transmitter is attached. Accordingly, the number of obtainments (the number of samples) of the specific rotation angle necessary for identifying the wheel assembly to which each of the transmitters is attached is less likely to be dispersed. This reduces the time necessary for identifying the wheel assembly to which each of the transmitters is attached.

In the above-described receiver, the correcting section may be configured such that, when the rotation angle that is not included in a predetermined range is obtained, the correcting section corrects the obtained rotation angle to obtain the specific rotation angle that is included in the predetermined range.

In the above described receiver, the correcting section may be configured to use, as the specific rotation angle, a value obtained by performing a modulo operation on the rotation angle obtained by the obtaining section with the value of the angle difference between the specific angles.

This facilitates the correction of the rotation angle.

Effects of the Invention

The present invention reduces the time necessary for identifying the wheel assembly to which each of the transmitters is attached.

BRIEF DESCRIPTION OF THE DRAWINGS

FIG. 1A is a block diagram illustrating a tire condition monitoring system mounted on a vehicle.

FIG. 1B is a schematic diagram illustrating the relationship between each wheel assembly of the vehicle and the detection axis of an acceleration sensor.

MODES FOR CARRYING OUT THE INVENTION

Figure 2:
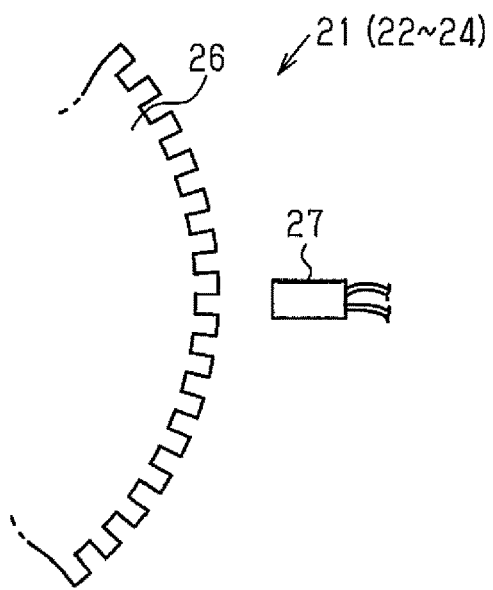
FIG. 2 is a schematic diagram of a rotation sensor unit.

A receiver according to one embodiment will now be described.

As shown in FIG. 1A, a tire condition monitoring system 30, which is a tire condition monitoring apparatus, is mounted on a vehicle 10. At first, the vehicle 10 is described.

The vehicle 10 includes a start switch 14 and a vehicle controller 15. The vehicle controller 15 switches the state of the vehicle 10 between an activated state and a deactivated state in accordance with operation of the start switch 14. The activated state of the vehicle 10 refers to a state in which operation of the vehicle 10 by the driver, such as operation of the acceleration pedal and operation of an on-vehicle device such as the air conditioner, causes the vehicle 10 to travel or the on-vehicle device to operate. In the deactivated state of the vehicle 10, the traveling of the vehicle 10 and the operation of the on-vehicle device are not performed even if operation of the vehicle 10 is performed by the driver.

The vehicle 10 includes four wheel assemblies 11. Each of the wheel assemblies 11 includes a wheel 12 and a tire 13 attached to the wheel 12. When necessary, the wheel assembly 11 at the right front side will be referred to as a right front wheel assembly FR, the wheel assembly 11 at the left front side will be referred to as a left front wheel assembly FL, the wheel assembly 11 at the right rear side will be referred to as the right rear wheel assembly RR, and the wheel assembly 11 at the left rear side will be referred to as a left rear wheel assembly RL.

The vehicle 10 includes an antilock braking system (ABS) 20. The ABS 20 includes an ABS controller 25, and rotation sensors 21 to 24 corresponding to the four wheel assemblies 11, respectively. The first rotation sensor unit 21 corresponds to the left front wheel assembly FL, and the second rotation sensor unit 22 corresponds to the right front wheel assembly FR. The third rotation sensor unit 23 corresponds to the left rear wheel assembly RL, and the fourth rotation sensor unit 24 corresponds to the right rear wheel assembly RR. The ABS controller 25 is configured by a microcomputer or the like so as to obtain the rotation angle of each of the wheel assemblies 11 based on signals from the rotation sensor units 21 to 24. In the present embodiment, the ABS controller 25 and the rotation sensor units 21 to 24 serve as a rotation angle detecting section.

Figure 3:
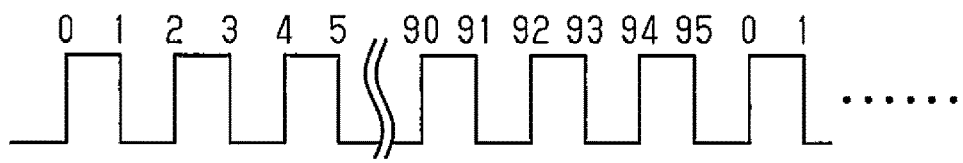
FIG. 3 is a schematic diagram of pulses generated by rotation of the wheel assembly.

As shown in FIG. 2, each of the rotation sensor units 21 to 24 includes a gear (pulse wheel) 26, which rotates integrally with the wheel assembly 11, and a detector 27 arranged to face the outer peripheral surface of the gear 26. The gear 26 has multiple teeth (forty-eight teeth in the present embodiment) at equal angular intervals on the outer circumferential surface. The detector 27 detects pulses generated when the gear 26 is rotated. The ABS controller 25 is connected to the detector 27 by wire and obtains the rotation angle of each of the wheel assemblies 11 based on a count value of the pulses (hereinafter, referred to as a pulse count value) as a detection value of each of the detectors 27. Specifically, when the gear 26 is rotated, the pulses corresponding to the number of the teeth are generated in the detector 27. The ABS controller 25 counts the pulses generated in the detector 27. As shown in FIG. 3, in the present embodiment, rising edges and falling edges of the pulses are counted. Since the number of the teeth is forty-eight, the ABS controller 25 counts the pulse from 0 to 95. Thus, the resolution of each of the rotation sensor units 21 to 24 is 3.75°.

The tire condition monitoring system 30 will now be described.

As shown in FIG. 1A, the tire condition monitoring system 30 includes four transmitters 31 and a receiver 50. Each transmitter 31 is attached to one of the four wheel assemblies 11. The receiver 50 is installed in the vehicle 10. The transmitter 31 is attached to the wheel assembly 11 so as to be arranged in the inner space of the tire 13. The transmitter 31 is fixed to the tire valve, the wheel 12, or the tire 13. The transmitter 31 detects the condition (for example, the tire air pressure and tire internal temperature) of the corresponding tire 13 and wirelessly transmits transmission data including detected information of the tire 13 to the receiver 50. The tire condition monitoring system 30 monitors the condition of the tire 13 by receiving the transmission data transmitted from the transmitter 31 through the receiver 50.

Figure 4:
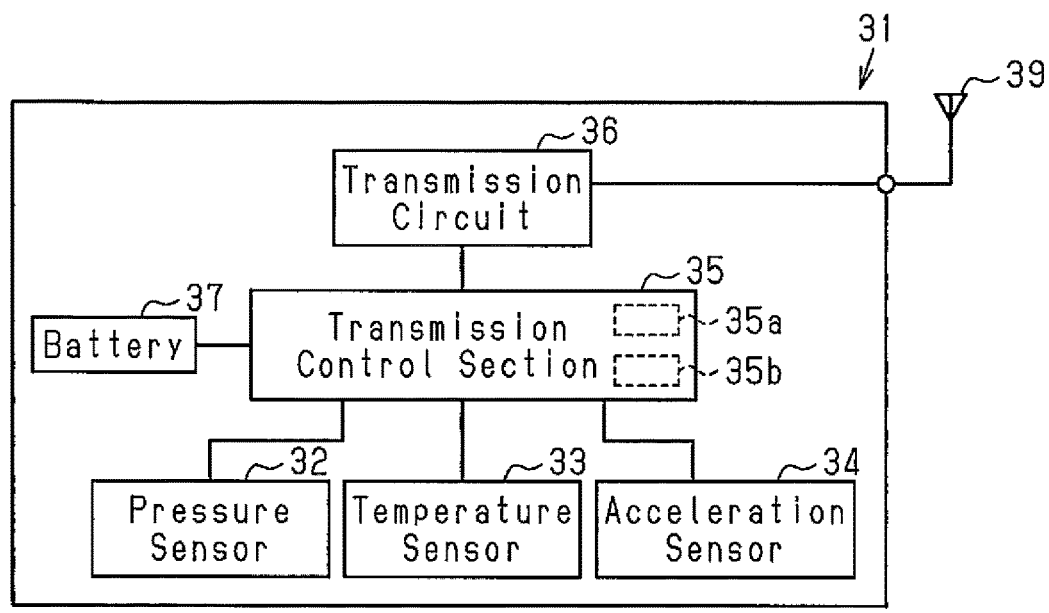
FIG. 4 is a block diagram illustrating a schematic configuration of a transmitter.

As shown in FIG. 4, each of the transmitters 31 includes a pressure sensor 32, a temperature sensor 33, an acceleration sensor 34, a transmission control section 35, a transmission circuit 36, a battery 37, and a transmission antenna 39. The transmitter 31 is driven by power supplied from the battery 37, and the transmission control section 35 controls operation of the transmitter 31 in an integrated manner. The battery 37 may be a primary battery or a power storage device such as a rechargeable battery and a capacitor.

The pressure sensor 32 detects the air pressure of the corresponding tire 13. The pressure sensor 32 outputs the detection result to the transmission control section 35. The temperature sensor 33 detects the temperature inside the corresponding tire 13. The temperature sensor 33 outputs the detection result to the transmission control section 35.

As shown in FIG. 1B, the acceleration sensor 34 includes a detection axis 34a so as to detect acceleration in the direction along the detection axis 34a. The acceleration sensor 34 outputs the detection result to the transmission control section 35. The acceleration sensor 34 may be a uniaxial acceleration sensor 34 or a multiaxial acceleration sensor 34.

The acceleration sensor 34 is arranged such that the detection axis 34a is directed (downward) in the vertical direction when the transmitter 31 is located at the lowermost position or the uppermost position of the wheel assembly 11.

If a multiaxial acceleration sensor 34 having a detection axis other than the detection axis 34a is employed, the acceleration applied in each of the detection axes is independently detected. Hereinafter, the acceleration detected by the acceleration sensor 34 denotes acceleration detected in the detection axis 34a.

As shown in FIG. 4, the transmission control section 35 is configured by a microcomputer or the like including a CPU 35a and a transmission storage section 35b (a RAM, a ROM and the like). An ID code indicating individual identification information of each of the transmitters 31 is stored in the transmission storage section 35b. Accordingly, an ID code is registered in each transmitter 31. For the illustrative purposes, the ID code of the transmitter 31 attached to the left front wheel assembly FL is referred to as FLID, the ID code of the transmitter 31 attached to the right front wheel assembly FR is referred to as FRID, the ID code of the transmitter 31 attached to the left rear wheel assembly RL is referred to as RLID, and the ID code of the transmitter 31 attached to the right rear wheel assembly RR is referred to as RRID.

Various programs for controlling the transmitter 31 are stored in the transmission storage section 35b. The transmission control section 35 includes a timing function. The timing function is implemented by, for example, a timer or a counter. The transmission control section 35 acquires detection results detected by the pressure sensor 32, the temperature sensor 33, and the acceleration sensor 34 at a predetermined acquisition interval.

The transmission control section 35 generates transmission data including, for example, a tire condition (for example, the tire air pressure and the tire internal temperature) and the ID code based on the detection result. The transmission control section 35 outputs the generated transmission data to the transmission circuit 36. The transmission circuit 36 modulates the transmission data output from the transmission control section 35. The modulated transmission data is transmitted from the transmission antenna 39 as a wireless signal. The wireless signal is transmitted as, for example, a signal of an RF band (for example, a 315 MHz band and a 434 MHz band).

The transmitter 31 executes two different transmission modes: normal transmission, at which the transmission data is transmitted regardless of the rotation angle of the wheel assembly 11, and specific angle transmission, at which the transmission data is transmitted when the rotation angle of the wheel assembly 11 matches a predetermined specific angle.

At the normal transmission, the transmission data is transmitted at a predetermined interval. The predetermined interval is set to, for example, ten seconds to several tens of seconds. For example, the specific angle transmission is executed when the vehicle 10 is started to travel after the vehicle 10 has been in a stopped state continuously for a predetermined time or longer. The predetermined time is set to a time in which a tire can be replaced, for example, several tens of minutes to several hours. That is, the specific angle transmission is executed when the position of the wheel assembly 11 has possibly been changed due to tire rotation. Whether the vehicle 10 is traveling or in a stopped state is determined based on the detection result of the acceleration sensor 34 (the centrifugal acceleration).

At the specific angle transmission, the transmission data is transmitted when the transmission control section 35 detects that the rotation angle of the wheel assembly 11 matches the predetermined specific angle. Specifically, the transmission data is transmitted when the specific angle is detected and a predetermined time (for example, ten seconds to several tens of seconds) has elapsed since the last transmission of the transmission data.

Figure 5A:
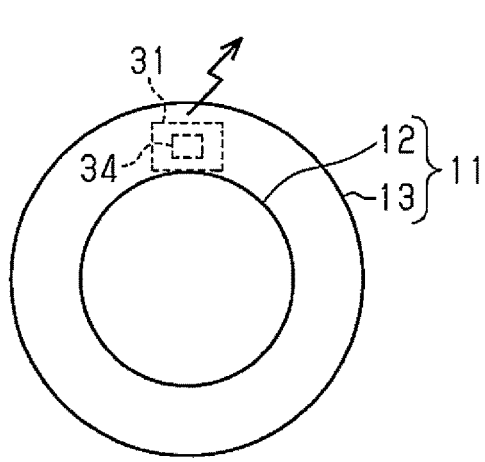
FIG. 5A is a schematic diagram illustrating a first angle.
Figure 5B:
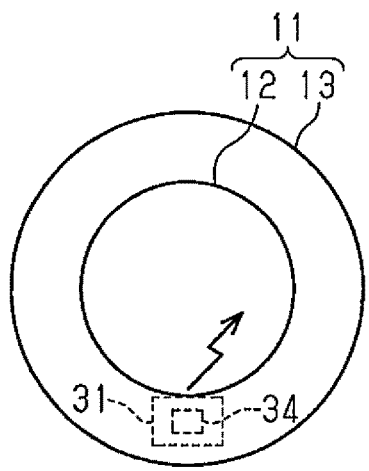
FIG. 5B is a schematic diagram illustrating a second angle.

As shown in FIGS. 5A and 5B, multiple specific angles are set, which include a first angle when the transmitter 31 is located at the uppermost position of the wheel assembly 11 and a second angle when the transmitter 31 is located at the lowermost position of the wheel assembly 11. When the first angle is defined as a reference (0°), the second angle is 180°. The angle difference between the first angle and the second angle is 180°. The transmission control section 35 transmits transmission data alternately at the first angle and the second angle.

Whether the transmitter 31 is located at a position corresponding to the specific angle can be detected based on the acceleration detected by the acceleration sensor 34. As described above, the direction in which the detection axis 34a extends is the same as the direction in which the centrifugal force is applied regardless of the rotation angle of the wheel assembly 11. Thus, the acceleration sensor 34 detects the centrifugal acceleration regardless of the rotation angle of the wheel assembly 11. On the other hand, the gravitational acceleration is always applied in the vertical direction. Thus, in a case in which the detection axis 34a is not directed in the vertical direction, the acceleration sensor 34 detects a component force of the gravitational acceleration (a component of the gravitational acceleration). The acceleration sensor 34 detects an acceleration obtained by adding the gravitational acceleration to the centrifugal acceleration.

Unless the vehicle 10 is abruptly accelerated or stopped, the centrifugal acceleration changes slightly in one turn of the wheel assembly 11. Accordingly, the acceleration changed in one turn of the wheel assembly 11 is deemed as the gravitational acceleration. Thus, whether the rotation angle of the wheel assembly 11 matches the specific angle can be detected by using a change of the gravitational acceleration. When only the gravitational acceleration is considered, the gravitational acceleration changes in one turn of the wheel assembly 11 in a range between +1 G and −1 G inclusive. In the present embodiment, the gravitational acceleration is +1 G when the transmitter 31 is located at the lowermost position of the wheel assembly 11, and the gravitational acceleration is −1 G when the transmitter 31 is located at the uppermost position of the wheel assembly 11.

The transmission control section 35 transmits the transmission data when detecting that the rotation angle of the wheel assembly matches the specific angle by transmitting the transmission data based on the acceleration detected by the acceleration sensor 34. The transmission angle at which the transmission data is transmitted varies with respect to the specific angle as the center of the variation due to the accuracy of the acceleration sensor 34, the obtaining interval in which the transmission control section 35 obtains the detection result from the acceleration sensor 34, or disturbance caused by the travelling condition.

The receiver 50 will now be described.

As shown in FIG. 1A, the receiver 50 includes a reception control section 51, a reception circuit 52, and a reception antenna 56. The reception control section 51 is connected to a display 57 mounted on the vehicle 10. The reception control section 51 is configured by a microcomputer or the like including a reception CPU 54 and a reception storage section 55 (a ROM, a RAM and the like). The reception control section 51 includes a timing function. The timing function is implemented by, for example, a timer or a counter. The reception circuit 52 demodulates the wireless signal received from each of the transmitters 31 via the reception antenna 56 and outputs the transmission data to the reception control section 51. The reception circuit 52 serves as a receiving section.

The reception control section 51 acquires the condition of the tire 13 (for example, the tire air pressure and the tire internal temperature) based on the transmission data from the reception circuit 52. When an anomaly occurs in the tire 13, the reception control section 51 executes informing by using the display 57. The display 57 displays the pressure of each of the tires 13 in association with the positions of the wheel assemblies 11.

The reception storage section 55 stores the ID codes of the four transmitters 31 mounted on the wheel assemblies 11 of the vehicle 10 on which the receiver 50 is mounted. With this, the receiver 50 is associated with the transmitters 31. The reception control section 51 recognizes the transmission data transmitted from the four transmitters 31, which are attached to the wheel assemblies 11 of the vehicle 10 equipped with the receiver 50, as the transmission data transmitted to the reception control section 51. The reception control section 51 compares the identification information (ID code) registered to the transmitter 31 that has transmitted the transmission data with the identification information (ID code) registered to the receiver 50 based on the transmission data received by the reception circuit 52 and the ID code stored in the reception storage section 55. When determining that the transmission data is transmitted from the transmitter 31 associated with the receiver 50, the reception control section 51 deems data (pressure data and temperature data) indicating the condition of the tire 13 included in the transmission data as data of the vehicle 10 on which the receiver 50 is mounted.

Next, a wheel assembly position identifying process for identifying the wheel assembly 11 to which each of the transmitters 31 is attached will be described together with the operation thereof. The wheel assembly position identifying process is executed, for example, when the vehicle 10 is switched from the deactivated state to the activated state through an operation of the start switch 14. Hereinafter, the transmission mode of the transmitter 31 is set to the specific angle transmission. With this, the reception control section 51 is capable of automatically recognizing the wheel assembly 11 to which each of the transmitters 31 is attached even when the tire rotation is performed.

The reception control section 51 obtains the pulse count value (the rotation angle of the wheel assembly 11) of each of the rotation sensor units 21 to 24 from the ABS controller 25 upon reception of the transmission data. The reception control section 51 calculates the rotation angle of each of the wheel assemblies 11 based on the pulse count value. In the present embodiment, the reception control section 51 serves as an obtaining section. That is, the obtaining section is a part of the functions of the reception control section 51.

In the traveling of the vehicle 10, the numbers of rotations (the rotation speeds) of the wheel assemblies 11 are different from each other due to the influence of the differential gear or the like. The relative positions of the transmitters 31 attached to the wheel assemblies 11, namely the differences between the rotation angles of the wheel assemblies 11 change in accordance with the traveling of the vehicle 10. Thus, in a case in which the transmitters 31 transmit the transmission data at the specific angle, the reception control section 51 obtains the rotation angle of each of the four wheel assemblies 11 several times upon reception of the transmission data. Consequently, the variation of the rotation angle of one wheel assembly 11 among the four wheel assemblies 11 becomes small. In other words, in a case in which the transmitters 31 transmit the transmission data at the specific angles, when the pulse count value is obtained upon reception of the transmission data, one of the rotation sensor units 21 to 24 has a small value of the variation of the pulse count value.

Figure 6A:
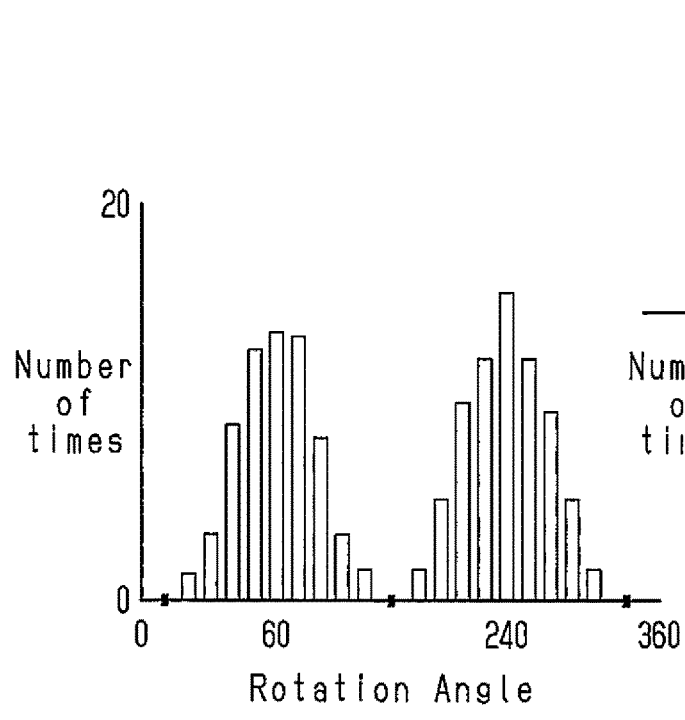
FIG. 6A is a diagram showing the distribution when obtaining the rotation angle of the wheel assembly to which is attached the transmitter that has transmitted the transmission data transmitted at the specific angle upon reception of the transmission data.

For example, when one of the transmitters 31 transmits the transmission data several times and the rotation angle of the wheel assembly 11 to which the transmitter 31 that has the transmitted transmission data is attached is obtained upon each reception of the transmission data, the obtained rotation angles will be distributed as shown in FIG. 6A. In contrast, when one of the transmitters 31 transmits the transmission data several times and the rotation angle of the wheel assembly 11 to which the transmitter 31 that has transmitted transmission data is not attached is obtained upon each reception of the transmission data, the rotation angles will be distributed irregularly. In the example shown in FIG. 6A, the number of times the rotation angles around 60° and 240° are obtained is great, and the number of times decreases as the obtained angles deviate from 60° and 240°. The pulse count value is reset when the vehicle 10 is set to the deactivated state by the start switch 14. Accordingly, the correlation between the absolute angle of the wheel assembly 11 and the specific angle is changed each time the vehicle 10 is switched to the deactivated state. In the following description, the rotation angle obtained from the rotation sensor units 21 to 24 upon reception of the transmission data transmitted at the first angle is defined as a first obtained rotation angle, and the rotation angle obtained from the rotation sensor units 21 to 24 upon reception of the transmission data transmitted at the second angle is defined as a second obtained rotation angle. Further, the first obtained rotation angle and the second obtained rotation angle are collectively referred to as obtained rotation angles.

When acquiring an obtained rotation angle upon reception of the transmission data, the reception control section 51 performs a modulo operation on the obtained rotation angles with the angle difference between the specific angles. The obtained rotation angle is subjected to modulo operation with 180° since the angle difference between the specific angles, that is, the difference between the first angle and the second angle is 180°.

The reception control section 51 uses the value obtained through the modulo operation (remainder) as a specific rotation angle. Since the first obtained rotation angle or the second obtained rotation angle has the same value before and after the modulo operation, it can be said that no correction (or no conversion) is performed. That is, the correction (or conversion) of an obtained rotation angle refers to arithmetic processing that is performed on the obtained rotation angle such that the first obtained rotation angle and second obtained rotation angle can be regarded as the same angle even when the values are not changed at the end. The reception control section 51 functions as a correcting section. That is, the correcting section is a part of the functions of the reception control section 51.

The specific rotation angle can be regarded as a rotation angle obtained upon reception of transmission data transmitted at the same specific angle (the first angle or the second angle). The angle difference between the first angle and the second angle is 180° in either rotation direction of the wheel assembly 11. That is, it can be said that the first angle and the second angle are set to be equiangular within the possible range of the rotation angle (360°). Thus, when 180° is subtracted from (or added to) the first angle, the second angle is obtained. Likewise, when 180° is subtracted from (or added to) to the second angle, the first angle is obtained. Accordingly, if the obtained rotation angle is subjected to modulo operation with 180°, one of the first obtained rotation angle and the second obtained rotation angle that has the larger absolute angle can be regarded as the same obtained rotation angle as the one with the smaller absolute angle. Thereby, when the obtained rotation angle is not included in a predetermined range (0° to 180°), correction (modulo operation) of the obtained rotation angle is performed so that a specific rotation angle included in the predetermined range is obtained. The predetermined range is the same as the angle difference between the specific angles (180° in the present embodiment).

For example, in the example shown in FIG. 6A, the first angle corresponds to 60° (the first obtained rotation angle is 60°), and the second angle corresponds to 240° (the second obtained rotation angle Is 240°). The specific rotation angle obtained by performing a modulo operation on 60° with 180° is 60°, and the specific rotation angle obtained by performing a modulo operation on 240° with 180° is 60°. Therefore, both 60° and 240° are treated as 60°.

Figure 6B:
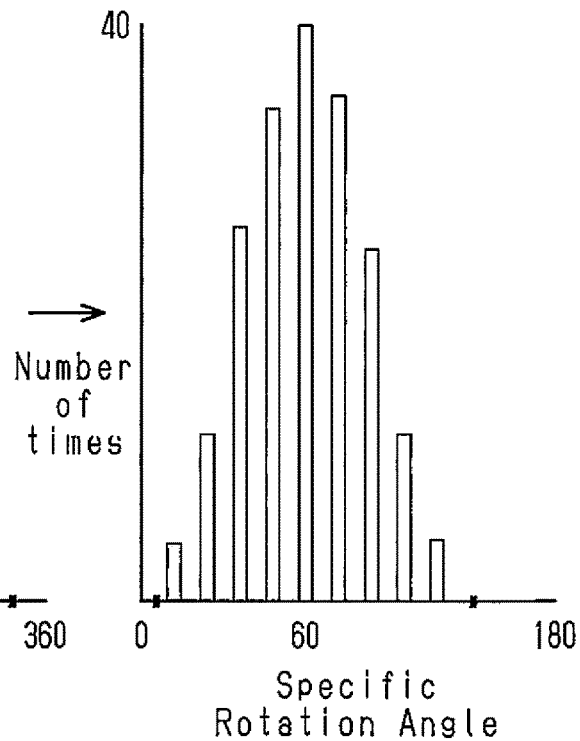
FIG. 6B is a diagram in which the distribution shown in FIG. 6A is converted into distribution of a specific rotation angle.

When the distribution of the values of the obtained rotation angle shown in FIG. 6A is converted into the distribution of the values of the specific rotation angle, the distribution shown in FIG. 6B is obtained. That is, a distribution is obtained in which the values of the obtained rotation angle that are distributed at angles around 240° are accumulated onto the values of the obtained rotation angle around 60°.

In the present embodiment, since the modulo operation is performed with 180°, the possible values (range) of the specific rotation angle is from 0° to 176.25° (corresponding to 48 counts). Therefore, the derivation of a specific rotation angle can be regarded as reduction of the possible value (range) of the rotation angle and aggregation of the obtained rotation angle into that range.

As described above, it is possible to regard two specific rotation angles obtained by performing the modulo operation on the first and second obtained rotation angles as being obtained upon reception of transmission data transmitted at the same specific angle. The reception control section 51 identifies the correspondence between the ID codes and the wheel assemblies 11, that is, identifies the wheel assembly 11 to which each transmitter 31 is attached, by using the specific rotation angles.

Figure 7:
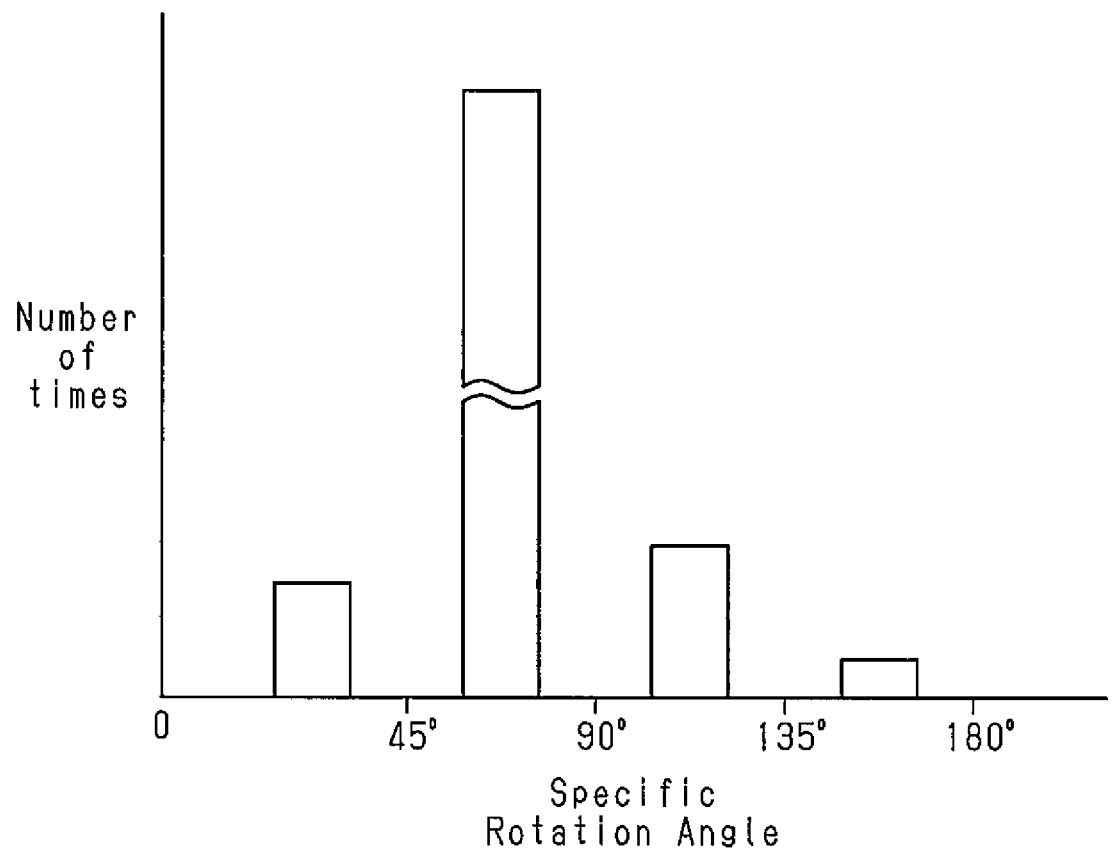
FIG. 7 is a diagram showing angle ranges obtained by dividing the range of the possible specific angle into four equal parts.

As shown in FIG. 7, the reception control section 51 divides the possible range of the specific rotation angle into equal parts to obtain angle ranges and assigns each value of the specific rotation angle to one of the angle ranges. As a result, a histogram is created in which each segment represents the number of times the specific rotation angle is included in each angle range. In the present embodiment, angle ranges obtained by dividing the possible range of the specific rotation angle into four equal parts are set. The angle ranges include a range from 0° to 44°, a range from 45° to 89°, a range from 90° to 134°, and a range from 135° to 179°. In accordance with the resolution, the range from 0° to 44° includes specific rotation angles from 0° to 41.25°, the range from 45° to 89° includes specific rotation angles from 45° to 86.25°, the range from 90° to 134° includes specific rotation angles from 90° to 131.25°, and the range from 135° to 179° includes specific rotation angles from 135° to 176.25°.

As described above, when rotation angles are obtained upon reception of transmission data, the variation of the rotation angles is small in one of the four wheel assemblies 11. Therefore, when the specific rotation angles are assigned to the above-mentioned four angle ranges, the number of times the specific rotation angle is obtained is concentrated in a specific angle range for one of the four wheel assemblies 11. In contrast, with respect to the remaining three wheel assemblies 11, the numbers of times the specific rotation angle is obtained are dispersed randomly, so that the number of times the specific rotation angle is included does not concentrate in a specific angle range. Therefore, when the specific rotation angles are assigned to the angle ranges, it is possible to identify the wheel assembly 11 to which each transmitter 31 is attached based on whether an angle range exists in which the number of times the specific rotation angle is included is prominently great. Whether there is an angle range in which the number of times the specific rotation angle is included is prominently great is determined based on whether there is a difference greater than or equal to a threshold between the greatest number of times the specific rotation angle is included in an angle range and the number of times the specific rotation angle is included in another angle range.

For example, when the specific rotation angles shown in FIG. 6B are assigned to four angle ranges, the result shown in FIG. 7 is obtained. As can be seen from FIG. 7, when the specific rotation angles are assigned to the respective angle ranges, the number of times the specific rotation angle is included in the range from 45° to 89° is prominently great. This is because the specific rotation angles that are concentrated at angles around 60° are included in the range from 45° to 89°. When the distribution of the values of the specific rotation angle shown in FIG. 7 is the one that is related to the right front wheel assembly FR obtained upon reception of the transmission data transmitted from the transmitter 31 having the ID code of the FRID, the transmitter 31 that has the ID code of the FRID can be identified as being attached to the right front wheel assembly FR. That is, the reception control section 51 can associate the ID codes with the wheel assemblies 11. When associating the FFID, FRID, RLID, RRID with the four wheel assemblies 11, the reception control section 51 stores the correspondence in the reception storage section 55 and ends the wheel assembly position identifying process. The reception control section 51 functions as an identifying section. That is, the identifying section is a part of the functions of the reception control section 51.

The identification of the wheel assembly 11 to which each transmitter 31 is attached can be performed by using the first obtained rotation angle or the second obtained rotation angle without obtaining the specific rotation angle. For example, it is possible to identify the wheel assembly 11 to which each transmitter 31 is attached by assigning the values of the first obtained rotation angle to the same angle ranges as the above-described angle ranges and counting the number of times the first obtained rotation angle is included in each angle range. However, in In this case, since the number of times the second obtained rotation angle is obtained has not been added up, the time required to obtain the first obtained rotation angle corresponding to the added up amount becomes longer. If it is assumed that all the transmission data can be received by the reception circuit 52 and the values of the obtained rotation angle are distributed similarly, the time required for an angle range in which the number of times the first obtained rotation angle is included is prominently great to appear will be twice as long as the time required for an angle range in which the number of times the specific obtained rotation angle is included is prominently great. The same applies to a case in which the wheel assembly 11 to which each transmitter 31 is attached is identified by using the second obtained rotation angle.

The above-described facts are applicable not only to the wheel assembly position identifying process that uses the number of times the obtained rotation angle is included as in the present embodiment, but also to a wheel assembly position identifying process that uses the difference in the number of rotations (rotation speeds) between the wheel assemblies during traveling. In order to acquire the occurrence of a difference in the number or rotations (rotation speed) between the wheel assemblies 11, the number of samples of the rotation angle needs to be more than or equal to a predetermined number. When multiple specific angles are set and the values of the obtained rotation angle are dispersed to the first obtained rotation angle and the second obtained rotation angle, the number of samples that can be used for the wheel assembly position identifying process will also be dispersed with respect to the number of times of transmission of the transmission data. In this regard, the use of the specific rotation angle allows for aggregation of the number of samples available for the wheel assembly position identifying process. Therefore, by performing the wheel assembly position specifying process using the specific rotation angle, the wheel assembly 11 to which each transmitter 31 is attached can be identified in a shorter time than a case in which the wheel assembly position specifying process is performed without correcting the obtained rotation angle.

As one example of the wheel assembly position identifying process using a specific rotation angle, the process has been described in which the wheel assembly 11 to which each transmitter 31 is attached is identified based on the number of times the specific rotation angle is included in an angle range. In addition to this, it is possible to identify the wheel assembly 11 to which each transmitter 31 is attached in various ways.

For example, the specific rotation angle may be obtained several times, and the wheel assembly 11 to which each transmitter 31 is attached may be identified from the variation of the specific rotation angles. Also, each time a specific rotation angle is obtained, an angle difference between the obtained specific rotation angle and the specific rotation angle that was obtained the last time (the obtained specific rotation angle—the specific rotation angle that was obtained the last time) may be calculated, and the calculated angle difference may be determined to be within an acceptable range. The wheel assembly 11 to which each transmitter 31 is attached may be identified based on the number of times the angle difference is included in the acceptable range. Also, these wheel assembly identifying processes may be used in combination. In this case, two or more wheel assembly identifying processes may be performed in parallel, and the determination result that is obtained the earliest from among these wheel assembly identifying processes may be used. Further, the wheel assembly 11 to which each of the transmitters 31 is attached may be identified based on the conformity between the determination results of the wheel assembly position identifying processes. For example, in a case in which the same determination result is obtained in multiple wheel assembly position identifying processes, the determination result thereof is employed, while in a case in which different determination results are obtained in the multiple wheel assembly position identifying processes, the wheel assembly position identifying processes may be executed again.

The above-described embodiment achieves the following advantages.

(1) The reception control section 51 corrects or converts the obtained rotation angle by using the angle difference between the specific angles (equal angle). The specific rotation angle obtained in this manner can be regarded as the rotation angle obtained upon reception of the transmission data transmitted at a fixed angle (one specific angle). Therefore, as compared with the case of identifying the wheel assembly 11 to which each transmitter 31 is attached without correcting the obtained rotation angle, the wheel assembly 11 to which each transmitter 31 is attached can be identified in a shorter time.

Transmission of transmission data at multiple specific angles allows for identification of the wheel assembly 11 to which each transmitter 31 is attached even if one of the specific angles matches with the null point. Furthermore, the wheel assembly identifying process can be performed using a specific rotation angle that can be handled as a rotation angle obtained upon reception of transmission data transmitted at a fixed angle. Thus, it is possible to enjoy the advantage of avoidance of a null point by transmitting transmission data at multiple specific angles and the advantage of shortening of the wheel assembly identifying process by transmitting transmission data at a fixed angle.

(2) The reception control section 51 obtains the specific rotation angle by performing a modulo operation on the obtained rotation angle with the angle difference between the specific angles. The execution of the modulo operation allows the specific rotation angle to be obtained regardless of the value of the obtained rotation angle. Therefore, the reception control section 51 can easily obtain the specific rotation angle, and the load on the reception control section 51 is reduced.

(3) When separately identifying the wheel assembly 11 to which each transmitter 31 is attached with the first obtained rotation angle and the second obtained rotation angle, the first obtained rotation angle and the second obtained rotation angle need to be classified. In this case, the transmitter 31 alternately transmits the transmission data at the first angle and the second angle to classify the first obtained rotation angle and the second obtained rotation angle. If the receiver 50 recognizes that the transmission data is transmitted alternately at the first angle and the second angle, the obtained rotation angles may be classified alternately. Further, in some cases, the transmission data cannot be received due to the communication environment or the like, and therefore the transmission data transmitted at the first angle (or the second angle) is successively received. Also in this case, since the interval of transmission of the transmission data is recognized, it is possible to recognize that the transmission data transmitted at the same specific angle is received two consecutive times in a case in which the receiving interval of the transmission data is twice the transmitting interval of the transmission data.

However, in a case in which the transmission data cannot be received for several consecutive times, it is difficult to identify the wheel assembly 11 to which each of the transmitters 31 is attached. This is because it cannot be determined whether the transmission data, which is received after the transmission data cannot be received for several consecutive times due to the accuracy of the timing function of the reception control section 51 or the like, is transmitted at the first angle or the second angle. That is, it cannot be determined whether the obtained rotation angle should be classified into the first obtained rotation angle or the second obtained rotation angle.

It may be considered that angular data indicating the specific angle is included in the transmission data. However, in this case, the data length becomes long by the angular data. When the data length of the transmission data becomes long, the electric power consumption by transmitting the transmission data becomes large. In a case in which the angular data is made short (for example, 1 bit) in order to prevent the data length from being long, errors might not be detected although the angular data is incorrect.

Consequently, the reception control section 51 may erroneously recognize that the transmission data transmitted at the second angle is received despite the fact that the transmission data transmitted at the first angle is received. This may slow down or prevents the identification of the wheel assembly 11 to which each of the transmitters 31 is attached.

In contrast, if the obtained rotation angle is converted into the specific rotation angle, even the first obtained rotation angle or even the second obtained rotation angle is regarded as a rotation angle that is obtained upon reception of the transmission data transmitted at the same specific angle. Accordingly, even in a case in which the transmission data cannot be received for several consecutive times, it is possible to identify the wheel assembly 11 to which each of the transmitters 31 is attached. Also, it is unnecessary to classify the first obtained rotation angle and the second obtained rotation angle, and there is no need to include the angular data in the transmission data. Accordingly, the data length of the transmission data is shortened, and the electric power required for the transmitting is reduced. Further, since the angular data is not included in the transmission data, the identifying the wheel assembly 11 to which each of the transmitters 31 is attached will not be slowed down by the occurrence of errors in the angular data.

The embodiment may be modified as follows.

The calculation for obtaining a specific rotation angle is not limited to the modulo operation. The reception control section 51 may obtain a specific rotation angle by subtracting 180° from an obtained rotation angle when the obtained rotation angle is greater than or equal to 180°. In this case, if the obtained rotation angle is less than 180°, the reception control section 51 sets the specific rotation angle to the obtained rotation angle as it is.

As described above, when the obtained rotation angle is not included in the predetermined range (0° to 180°, correction (conversion) of the obtained rotation angle may be performed so that a specific rotation angle included in the predetermined range is obtained. When a rotation angle included in the predetermined range is obtained, the correction calculation is not necessary, which shortens the processing time.

The reception control section 51 may obtain a specific rotation angle by adding 180° to an obtained rotation angle when the obtained rotation angle is less than 180°. In this case, if the obtained rotation angle is greater than or equal to 180°, the reception control section 51 sets the specific rotation angle to the obtained rotation angle as it is.

Also in this case, when the obtained rotation angle is not included in the predetermined range (180° to 360°, correction (conversion) of the obtained rotation angle is performed such that a specific rotation angle included in the predetermined range is obtained. Thus, when a rotation angle included in the predetermined range is obtained, the correction calculation is not necessary, which shortens the processing time.

When the obtained rotation angle is less than 180°, the reception control section 51 may obtain a specific rotation angle by adding a first predetermined value to the obtained rotation angle. When the obtained rotation angle is greater than or equal to 180°, the reception control section 51 may obtain a specific rotation angle by subtracting a second predetermined value from the obtained rotation angle. Any combination of the first predetermined value and the second predetermined value may be employed as long as the total value is 180°. Specifically, a combination of 90° and 90° or a combination of 100° and 80° may be employed.

The reception control section 51 may obtain a specific rotation angle by converting the obtained rotation angle into a trigonometric function (tan or cot) having a period of n. If the obtained rotation angle is other than 180°, the reception control section 51 converts the obtained angle into a trigonometric function having a period of n. If the obtained rotation angle is 180°, the reception control section 51 sets the specific rotation angle to a number greater than the maximum value of the possible values of the trigonometric function when the obtained rotation angle is other than 180°.

As described above, "correcting the obtained rotation angle using the value of the angle difference between the specific angles" refers to a process in which, by using the difference between the specific angles (equal angle), two or more obtained rotation angles that are obtained upon reception of transmission data transmitted at different specific angles are made to be regarded as obtained rotation angles that are obtained upon reception of the transmission data transmitted at the same specific angle. Also, as described above, the correction process or the conversion process includes a process in which whether addition or subtraction should be performed is determined in accordance with the value of the obtained rotation angle.

Figure 8:
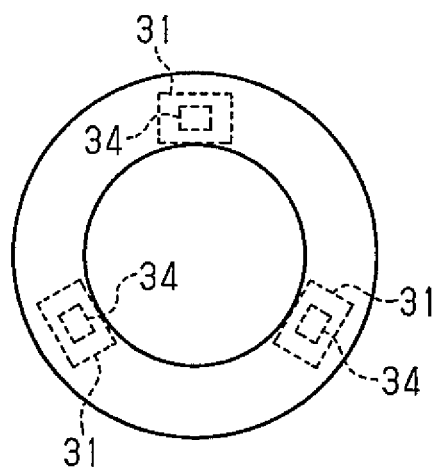
FIG. 8 is a diagram illustrating specific angle of a modification.

As shown in FIG. 8, three or more specific angles may be set. In this case also, the specific angles are set at equal angles. As shown in FIG. 8, the difference between the specific angles may be 120°. Alternatively, the difference may be 90°.

As shown in FIG. 8, when the difference between the specific angles is 120°, the reception control section 51 may obtain the specific rotation angle by performing a modulo operation on the obtained rotation angles with 120°. Also, the reception control section 51 may obtain the specific rotation angle by subtracting 120° from the obtained rotation angle when the obtained rotation angle is greater than or equal to 120° and less than 240° and may obtain the specific rotation angle by subtracting 240° (120°×2) from the obtained rotation angle when the obtained rotation angle is greater than or equal to 240°. In this case, if the obtained rotation angle is less than 120°, the reception control section 51 sets the specific rotation angle to the obtained rotation angle as it is.

The reception control section 51 may obtain the specific rotation angle by adding 240° (120°×2) to the obtained rotation angle when the obtained rotation angle is less than 120° and may obtain the specific rotation angle by adding 120° to the obtained rotation angle when the obtained rotation angle is less than 240°. In this case, if the obtained rotation angle is greater than or equal to 240°, the reception control section 51 sets the specific rotation angle to the obtained rotation angle as it is.

When three specific angles are set as described above, two the obtained rotation angles will be changed in accordance with the other obtained rotation angle. That is, an obtained rotation angle not included in the predetermined range is corrected to be included in the predetermined range.

The angle ranges may be obtained by dividing the possible range of the specific rotation angles into five or six equal parts. Further, the wheel assembly 11 to which each transmitter 31 is attached may be identified by using multiple sets of angle ranges that are equally divided by different values.

The transmission data does not necessarily need to be transmitted alternately at the first angle and the second angle. For example, the transmission data may be transmitted at the first angle and the second angle at random. Alternatively, the transmission data may be transmitted at the first angle or the second angle consecutively until switched to the other.

The reception storage section 55 may store the ID codes of the transmitters 31 attached to the wheel assemblies 11 and the ID code of the transmitter 31 attached to the spare tire. Further, the reception storage section 55 may store both of the ID codes of the transmitters 31 attached to summer tires and the ID code of the transmitters 31 attached to winter tires. In this case, the reception control section 51 may execute informing of an abnormality of the tires 13 corresponding to the ID codes of the four wheel assemblies from which the transmission data is transmitted most frequently.

The vehicle 10 only has to include multiple wheel assemblies 11, and for example, the vehicle 10 may be a motorcycle.

In the above description, various types of processes are performed by converting pulse count values to rotation angles. However, considering that the pulse count values indicate rotation angles, it is possible to perform processing using the pulse count values. For example, the specific rotation angle may be obtained by performing the modulo operation on the obtained pulse count value with 48. The "rotation angle" is not limited to the rotation angle itself but may be any parameter that indicates a rotation angle.

DESCRIPTION OF THE REFERENCE NUMERALS

10 . . . Vehicle; 11 . . . Wheel assembly; 21 to 24 . . . Rotation Sensor Unit; 25 . . . ABS Controller; 31 . . . Transmitter; 50 . . . Receiver; 51 . . . Reception Control Section (Obtaining Section, Correcting Section, and Identifying Section); 52 . . . Reception Circuit (Receiving Section).

The invention claimed is:

1. A receiver configured to be mounted on a vehicle having a rotation angle detecting section that detects rotation angles of respective wheel assemblies, wherein a transmitter is attached to each wheel assembly, the receiver being configured to identify the wheel assembly to which each transmitter is attached, the receiver comprising:

a reception circuit configured to receive transmission data that is transmitted from each transmitter when the transmitter detects that the associated wheel assembly is at any of different specific angles, which are set at equal angular intervals in a possible range of the rotation angle of the wheel assembly; and a microcomputer configured to:

obtain the rotation angles of respective wheel assemblies from the rotation angle detecting section upon reception of the transmission data by the reception circuit;

for each wheel assembly, correct the rotation angles obtained from the rotation angle detecting section by using a value of an angle difference between the specific angles, thereby converting the rotation angles obtained upon reception of the transmission data transmitted at the different specific angles into specific rotation angles that can be regarded as the rotation angles obtained upon reception of the transmission data transmitted at the same specific angle; and identify correspondence between ID codes included in the transmission data and the wheel assemblies based on variation of the specific rotation angles for each wheel assembly.

2. The receiver according to claim 1, wherein the microcomputer is configured such that, when the rotation angle that is not included in a predetermined range is obtained from the rotation angle detecting section, the microcomputer converts the obtained rotation angle into the specific rotation angle that is included in the predetermined range.

3. The receiver according to claim 1, wherein the microcomputer is configured to use, as the specific rotation angle, a value obtained by performing a modulo operation on the rotation angle obtained from the rotation angle detecting section with the value of the angle difference between the specific angles.

* * * * *